United States Patent [19]

Baxter

[11] Patent Number: 4,854,579
[45] Date of Patent: Aug. 8, 1989

[54] WIND INDICATOR FOR GOLFERS

[76] Inventor: G. Matthew Baxter, 589 Sheridan Rd., Glencoe, Ill. 60022

[21] Appl. No.: 233,070

[22] Filed: Aug. 17, 1988

[51] Int. Cl.[4] ............................................. A63B 57/00
[52] U.S. Cl. .................................. 273/32 H; 73/189; 73/861.85
[58] Field of Search ........................... 73/861.85, 189; 273/32 H

[56] References Cited

U.S. PATENT DOCUMENTS

| 2,346,864 | 4/1944 | Packard | 73/861.85 |
| 2,623,388 | 12/1952 | Woof et al. | 73/189 |
| 2,749,751 | 6/1956 | Hastings | 73/189 |
| 3,986,396 | 10/1976 | Raymond | 73/189 |
| 4,454,757 | 6/1984 | Weinstein | 73/189 |

*Primary Examiner*—George J. Marlo
*Attorney, Agent, or Firm*—Richard Bushnell

[57] ABSTRACT

There is disclosed a wind indicator for use by a golfer which includes a vane movably mounted on a base for indicating wind direction and a propellor rotatably mounted with the vane and carrying observable indicia which varry in appearance in accordance with the speed of the propeller and thus wind velocity.

9 Claims, 2 Drawing Sheets

U.S. Patent  Aug. 8, 1989  Sheet 1 of 2  4,854,579
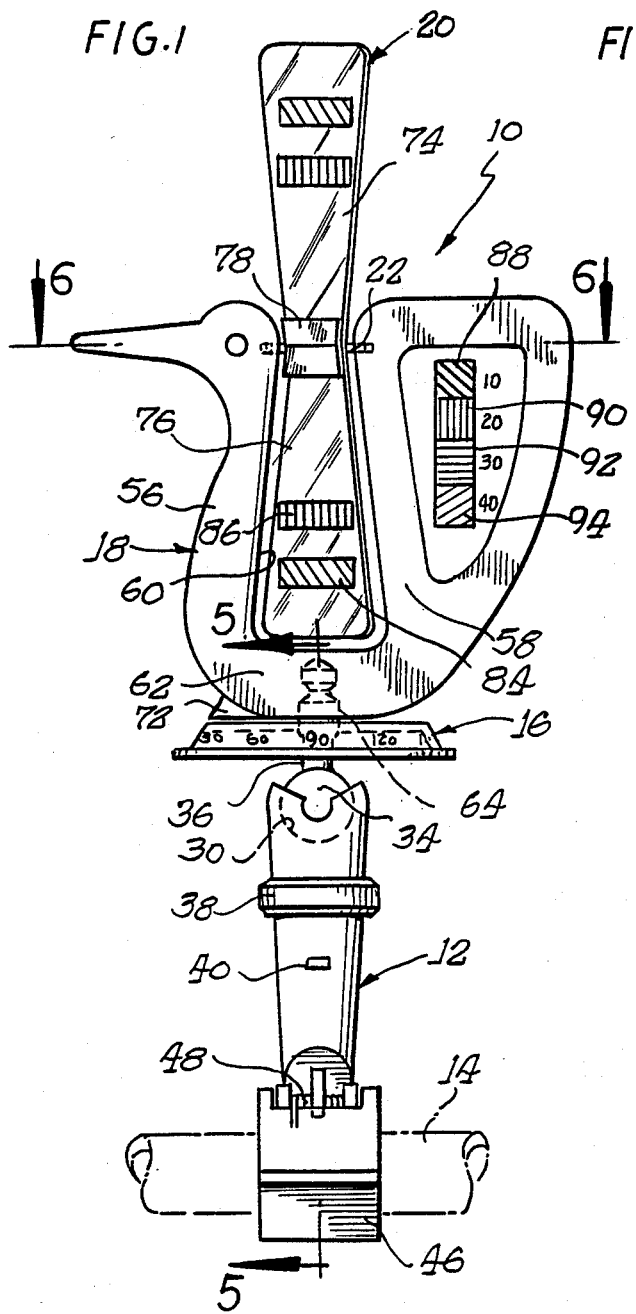
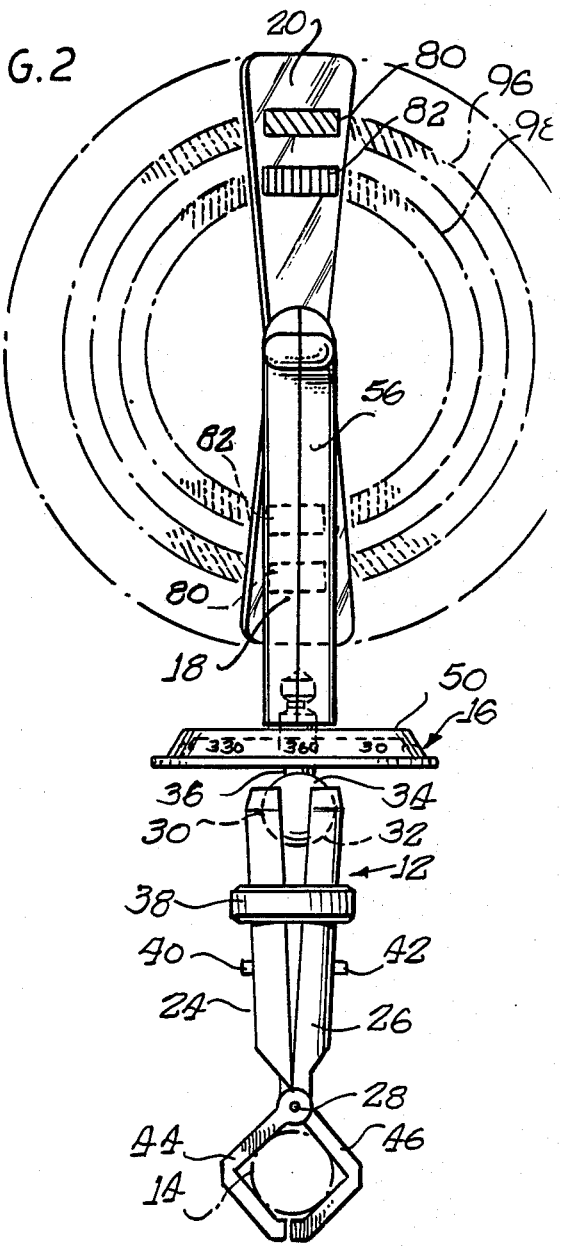
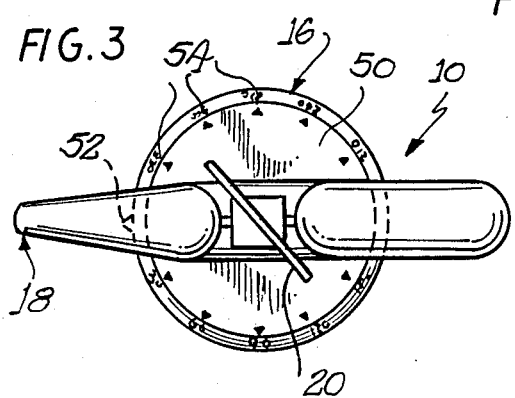
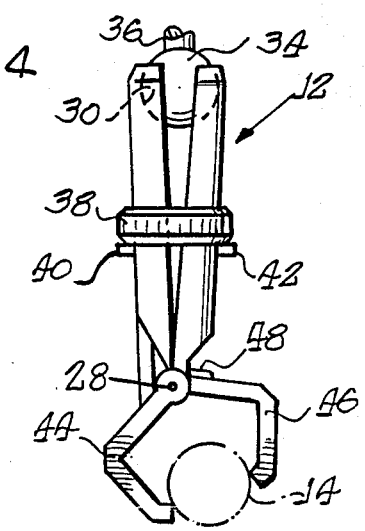

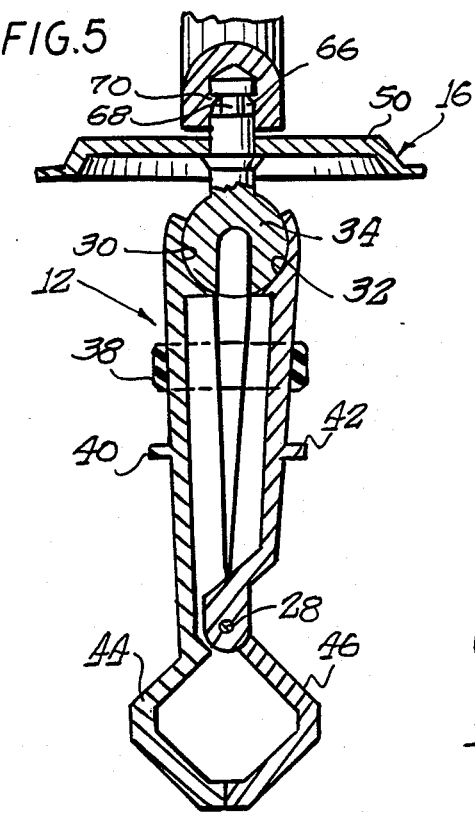
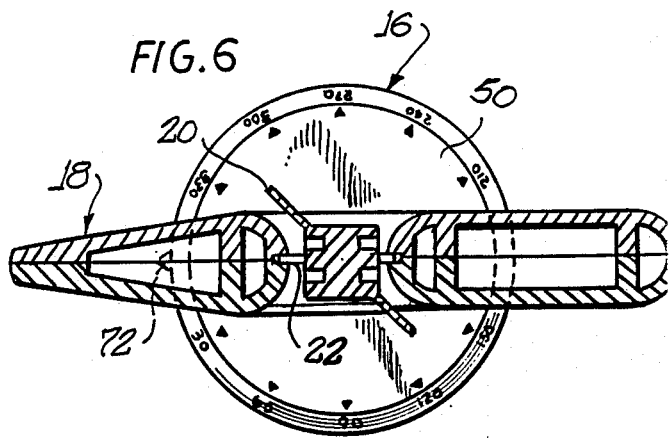
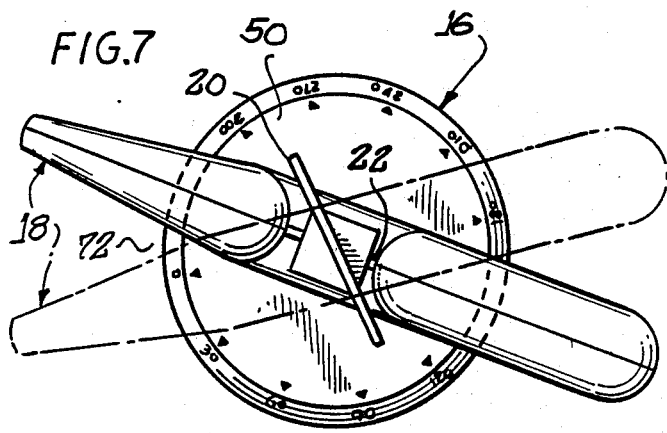
FIG. 8
| CLUB SELECTION GUIDE BASED ON 200 YARD HITTER | | | | | | | |
|---|---|---|---|---|---|---|---|
| WIND DIRECTION (LEFT 0° TO RIGHT (CLOCKWISE) 180) | | | | | | | |
| | ↑ | ↗ | ↗ | → | ↘ | ↘ | ↓ |
| WIND SPEED MPH | 0° | 30° | 60° | 90° | 120° | 150° | 180° |
| +10 DISTANCE | 217 | 215 | 209 | 201 | 191 | 185 | 183 |
| ADJUSTMENT | 0 | R9 | R15 | R17 | R15 | R9 | 0 |
| +20 DISTANCE | 234 | 230 | 217 | 203 | 183 | 170 | 166 |
| ADJUSTMENT | 0 | R26 | R30 | R34 | P30 | R17 | 0 |
| +30 DISTANCE | 251 | 245 | 226 | 206 | 174 | 155 | 140 |
| ADJUSTMENT | 0 | R17 | R45 | R51 | R45 | R26 | 0 |
| +40 DISTANCE | 269 | 260 | 234 | 212 | 165 | 140 | 131 |
| ADJUSTMENT | 0 | R34 | R60 | R69 | R60 | R34 | 0 |

WIND INDICATOR FOR GOLFERS

The present invention relates to a novel device aiding a golfer in analyzing wind conditions, and more specifically to a novel device for enabling a golfer to estimate the direction and velocity of the wind prior to making a desired golf shot.

BACKGROUND OF THE INVENTION

As is well known, the direction and velocity of the wind can have a very substantial effect on the travel of a golf ball both with respect to direction and distance. Golfers have devised various personal techniques for estimating wind conditions at the time it is desired to make a golf shot. For example, one common technique involves simply throwing a handful of grass into the air and observing the manner in which it is blown by the wind as it falls to the ground. Needless to say, such techniques are not particularly reliable and the results when used will very widely depending on the skill and experience of the golfer.

SUMMARY OF THE INVENTION

It is an object of the present invention to provide a novel wind indicator or analyzer which may be used by any golfer without requiring great skill or expertise in order to obtain a useful estimate as to the direction and velocity of the wind just prior to making a golf shot.

A more specific object of the present invention is to provide a novel wind analyzer or indicator of the above-described type which is of simple and economical construction and which may be easily used to obtain desired estimates as to the velocity of the wind and the direction in which the wind is blowing with respect to the desired line of flight of a golf ball.

Still another object of the present invention is to provide a novel wind indicator or analyzer of the above-described type which may be easily carried by a golfer or quickly detachably mounted to a golf cart.

Other objects and advantages of the present invention will become apparent from the following description and the accompanying drawings wherein:

BRIEF DESCRIPTION OF THE DRAWINGS

FIG. 1 is a side elevational view showing a wind indicator or analyzer incorporating features of the present invention;

FIG. 2 is a front elevational view of the wind analyzer or indicator as seen from the left-hand side of FIG. 1;

FIG. 3 is a plane view of the wind indicator or analyzer of the present invention;

FIG. 4 is a fragmentary elevational view showing how a clamping assembly incorporated in the wind analyzer may be manipulated for mounting the analyzer on a bar or handle of the golf cart or the like;

FIG. 5 is an enlarged fragmentary sectional view taken along line 5—5 in FIG. 1;

FIG. 6 is an enlarged sectional view taken along line 6—6 in FIG. 1;

FIG. 7 is a plane view similar to FIG. 3 but showing a wind vane portion of the analyzer alternatively in solid and broken lines for indicating different directions in which the wind is blowing; and FIG. 8 is a plane view of a chart adapted to be used in association with the wind indicator or analyzer for providing a golfer with an estimate of the effect of the wind velocity and direction determined by the indicator on the flight of a golf ball.

DETAILED DESCRIPTION OF THE INVENTION

Referring now more specifically to the drawings, wherein like parts are designated by the same numerals throughout the various figures, a wind analyzer or indicator 10 is shown in FIGS. 1-3, 6 and 7 which incorporates one embodiment of the present invention. The instrument 10 comprises a clamping assembly 12 adapted to be used as a handle for carrying the device or preferably, to detachably secure the instrument to a suitable bar or handle 14 of a golf cart or the like. The clamping assembly 12 includes a base 16 on which a weather vane or wind direction indicator 18 is pivotally mounted as will be described more in detail below. A propeller or fan blade 20 is rotatably supported on the weather vane member 18 by a shaft 22 for providing an indication of the wind velocity as will be hereinafter described.

The clamping assembly or support means 12 comprises a pair of upstanding members 24 and 26 pivotally connected by pin 28 adjacent lower ends thereof and combining together to provide a handle which may be used to carry the wind indicator, if desired. Upper ends of the support members 24 and 26 have complementary ball seats 30 and 32 formed therein for receiving a ball 34 supporting an upstanding stud 36 forming a part of the base 16. This arrangement provides a swivel connection between the base and the support means 12 so that the base may be readily adjusted to the desired horizontal position. It is noted that the outer surfaces of the support members 24 and 26 are tapered downwardly from the ball seats and a ring 38 slidably encircles these surfaces. The ring is adapted to be forced and wedged upwardly along the members 24 and 26 for causing them securely to grip the ball 34 to lock it in a desired adjusted position. Alternatively, the ring 38 may be moved downwardly to loosen the members 24 and 26 to permit adjustment of the ball relative to the support assembly Abutments or protuberances 40 and 42 project outwardly from the surfaces of the members 24 and 26 for limiting downward movement of the ring 38.

A lower end of the member 24 beneath the pivot pin 28 includes a jaw member 44 for partially embracing the bar or handle 14 on which the wind indicator is to be mounted. A complementary jaw member 46 is pivoted on the pin 28. A torsion spring 48 acting between the jaw member 46 and the support member 26 urges the jaw member 46 to the closed position shown in FIG. 2 so that the complementary jaw members 44 and 46 aggressively clamp the bar 14 therebetween. The jaw member 46 is adapted to be manually moved to the open position shown in FIG. 4 for enabling the clamping or support assembly to be mounted on or removed from the bar 14.

The base 16, in the embodiment shown, comprises a horizontal member 50 fixed on the upstanding stud 36. A point 52 or other form of indicia is provided on the periphery of the horizontal member 50. As will be described below, when the wind indicator is in use, the base member is manipulated so that the point 52 projects in the direction of the intended line of flight or target of the golf shot to be made. Additional indicia 54 are circularly spaced around the horizontal member 50 which indicia preferably include numerals indicating the number of degrees which each is displaced from the zero point defined by the arrow 52. Preferably, the indicia indicate points which are offset 30 degrees, 60 degrees, 90 degrees, 120 degrees, 150 degrees and 180 degrees from the zero point in both directions.

The weather vane member 18 preferably comprises a U-shaped body having upstanding legs 56 and 58 defining opposite sides of a slot 60 and joined by a bottom section or bight portion 62. The body of the weather vane may be provided with any desired ornamental design appearance such as the fanciful appearance of a bird or duck shown in the drawings, but preferably one of the legs and in this case leg 58, has a substantially broader surface area than the other leg. With this arrangement, when the weather vane member 18 is acted upon by the wind, the narrow side 56 will always point into the wind. In this connection, it is noted that the weather vane member 18 is freely rotatably supported on an upstanding pivot pin portion 64 of the base stud 36. As shown in FIGS. 1, 2 and 5, the pivot pin portion 64 is adapted to project into a bore 66 formed in the lower margin of the weather vane bottom section. An annular groove 68 in the pivot pin portion 64 is adapted to receive an internal rib 70 projecting from the wall of the bore 66 for retaining the parts in assembled relationship. Preferably, the body of the weather vane member is produced from a plastic material having sufficient resiliency so that the rib 70 may be snapped into the groove 68 for facilitating assembly of the parts.

As will be understood, when the weather vane is exposed to the wind, it will assume a position relative to the base dictated by the direction of the wind. An observer can then correlate the position of the weather vane member with the indicia on the base member 50 so as to determine the direction of the wind with respect to the zero point or indicia 52. During actual use of the device, the observer will position the base member so that the point 52 extends in the direction of the intended line of flight of a golf shot with the result that the position of the vane member 18 will indicate the number of degrees the wind direction varies from the intended line of flight. If desired, a pointer element 72 or other indicia may be provided on the body of the weather vane for cooperation with the indicia on the base member 50 to facilitate obtaining a reading or observation of the wind direction.

The propeller 20 comprises blades 74 and 76 which extend from a hub 78 mounted on the axial 22. The configuration of the blades 74 and 76 is such that the propeller is adapted to be driven and rotated by the wind at a speed which is proportional to the wind velocity. In accordance with a feature of the present invention, indicia 80 and 82 are provided on the blades 74 and corresponding indicia 84 and 86 are provided on the blade 76. In the preferred embodiment, these indicia are in the form of colored strips. For example, the indicia 80 and 84 may be green strips and the indicia 82 and 86 may be red strips.

When the propeller 20 is driven by the wind, the indicia will appear to the observer as colored bands in the air. The color intensity of the bands varies in accordance with the speed of the propeller and thus in accordance with the wind velocity. Therefore, the variations in the observable appearance or color intensity of bands provides the observer with an indication of the wind velocity. Preferably, cooperative or complementary indicia are provided on the leg portion 58 of the vane member which are calibrated in accordance with the wind velocity. More specifically, as indicated in FIG. 1, indicia in the form of color strips 88, 90, 92 and 94 are provided on the leg portion 58 of the weather vane. These strips are of varying color intensity corresponding to the intensity of the color bands produced when the propeller is rotated at different speeds. As previously indicated, when the propeller is rotated, the color strips or indicia 80-86 appear to an observer as annular bands which are indicated by the numerals 96 and 98 in FIG. 2. To an observer, the color intensity of these bands diminishes as the propeller speed increases. By matching the color intensity of the bands 96 and 98 with the varying color intensity of the indicia 88-94, the observer can obtain a reading of the approximate wind velocity. For example, in the embodiment shown, the indicia 88 has a color intensity corresponding to the intensity of the bands 96 and 98 when the propeller is driven at a speed produced by a wind velocity of 10 miles per hour. The color intensities of the successive indicia 90, 92 and 94 respectively correspond to the reduced color intensities of the bands 96 and 98 when the propeller is driven by wind velocities of 20 miles per hour, 30 miles per hour and 40 miles per hour. When using the wind indicator 10 in preparing to make a golf shot and selecting the proper golf club, a golfer first positions the base member 50 so that the indicia or point 52 extends in the direction of the intended line of flight or target of the golf shot. Any wind which is present will then cause the vane member 18 to rotate relative to the base member 50 as indicated by the solid and broken line positions in FIG. 7 so as to indicate the angular direction of the wind with respect to the zero point or intended line of flight indicated by the indicia 52. The golfer will then note this angular displacement of the wind. At the same time, the wind will drive the propeller so as to produce the appearance of the colored bands 96 and 98 as indicated in FIG. 2 and the golfer will note the color intensity of these bands and compare them with the indicia 88-94 to obtain an estimate of the wind velocity. With the knowledge of wind direction and velocity thus gained, the golfer is in a better position to make the right club selection for the golf shot to be made.

In order further to assist the golfer in making the right club selection, a chart 100 shown in FIG. 8 may be provided for use in conjunction with the wind indicator 10. The information compiled in this chart shows the effect of wind speed and direction on the distance a golf ball will travel. More specifically, the information on the chart is based on the wind action on a golf ball which is struck so that it would normally travel 200 yards in the absence of any wind. It is seen that the chart provides information as to the yardage which will be added or detracted from a 200 yard shot depending on wind velocity and direction. For example, if the wind is blowing from left to right and behind the golfer and at an angle of 30 degrees with respect to the intended line of flight, the second column indicates that the golf ball will travel 215 yards and move 9 yards to the right with a wind of 10 miles per hour, 230 yards and 26 yards to the right with a 20 mile an hour wind, 245 yards and 17 yards to the right with a 30 mile an hour wind and 260 yards and 34 yards to the right with a 40 mile an hour wind. It is noted that the data contained on chart 100 pertains to winds which are blowing from left to right. It is contemplated that a similar chart will also be provided containing data relative to winds which blow from right to left. With the information thus provided to the golfer, a proper club selection may be made for the distance to be travelled and in addition, the golfer will be advised as to the directional correction which should be made in the initial line of flight of the golf ball to arrive at the intended target.

While the preferred embodiment of the present invention has been shown and described herein, it is obvious that many details may be changed without departing from the spirit and scope of the appended claims.

I claim:

1. A wind indicator for use by a golfer comprising a base, a vane movably mounted on said base for indicating wind direction, a propeller rotatably mounted for movement with said vane and adapted to be driven by the wind at variable speeds in accordance with wind velocity, and observable indicia on said propeller, said indicia varying in observable appearance in accordance with the speed of the propeller and thus the wind velocity for thereby providing an indication of wind velocity, comprising a substantially horizontal member and a plurality of indicia on and spaced around said horizontal member for respectively pointing toward an intended line of flight of a golf ball and a plurality of different directions angularly offset from said line of flight, said indicia and said base being cooperable with said vane for providing an indication of wind direction relative to the intended line of flight.

2. A wind indicator, as defined in claim 1, which includes additional indicia on said vane adjacent said propeller, said additional indicia comprising a plurality of different appearing increments corresponding to increments of appearance of the propeller indicia at different propeller speeds whereby a matching of the appearance of one of said additional indicia increments with the appearance of the propeller indicia provides an indication of wind velocity.

3. A wind indicator, as defined in claim 2, wherein said base comprises a base member and a plurality of indicia on and spaced around said base member for respectively pointing toward an intended target of a golf ball and a plurality of different directions angularly offset from said intended target, said indicia on said base member being cooperable with said vane for providing an indication of wind direction relative to the intended target.

4. A wind indicator, as defined in claim 1, which includes support means for supporting said base, said support means comprising a clamp detachably connectable to a golf cart or the like, and a swivel connection between said base and said clamp for enabling the base to be adjusted to a desired position.

5. A wind indicator for use by a golfer comprising a base, a propeller, means for mounting said propeller on said base for rotation about a generally horizontal axis and for movement about a generally vertical axis relative to said base in accordance with wind direction, and observable indicia on said propeller, said indicia varying in observable appearance in accordance with the speed of the propeller and thus the wind velocity for thereby providing an indication of wind velocity, providing the appearance of a colored circular band during rotation of the propeller, the observable color intensity of said band varying and decreasing as the speed of the propeller and thus wind velocity increases.

6. A wind indicator, as defined in claim 5, which includes additional indicia adjacent said propeller affixed to said vane or said base, said additional indicia comprising a plurality of colored segments of different intensities, the intensity of each segment providing an appearance corresponding to the appearance of the colored band at different predetermined wind velocities whereby a comparison of the intensity of the colored band with said additional indicia provides an indication of wind velocity.

7. A wind indicator, as defined in claim 5, which includes a vane member comprising spaced apart upstanding leg portions, means rotatably mounting said propeller between said upstanding leg portions, said additional indicia as defined in claim 8 being located on one of said upstanding leg portions.

8. A wind indicator, as defined in claim 7, wherein said base comprises a horizontal member, said indicator further including pivot means supporting said vane member on said base member for movement around said generally vertical axis, first indicia on said base member adapted to be pointed in the direction of an intended target, and additional indicia on said base member cooperable with said vane member for providing an indication of any difference between wind direction and the direction of the intended target.

9. A wind indicator, as defined in claim 8, which includes support means optionally mountable on a golf cart or the like, and means providing a swivel connection between said support means and said base member for permitting adjustment of the base member to a desired horizontal position and also to a desired relative position to the intended target.

* * * * *

UNITED STATES PATENT AND TRADEMARK OFFICE
CERTIFICATE OF CORRECTION

PATENT NO. : 4,854,579
DATED : August 8, 1989
INVENTOR(S) : Baxter

It is certified that error appears in the above-identified patent and that said Letters Patent is hereby corrected as shown below:

Column 4, Line 22   "hour. When" change to --hour. When --

Column 5, Line 18   "velocity, comprising" change to
-- velocity, said base comprising --

Column 6, Line 11   "velocity, providing" change to
--velocity, said indicia comprising colored strip means, said strip means providing --

Signed and Sealed this

Ninth Day of October, 1990

*Attest:*

HARRY F. MANBECK, JR.

*Attesting Officer*     *Commissioner of Patents and Trademarks*

UNITED STATES PATENT AND TRADEMARK OFFICE
CERTIFICATE OF CORRECTION

PATENT NO. : 4,854,579

DATED : August 8, 1989

INVENTOR(S) : G. Mattews Baxter

It is certified that error appears in the above-identified patent and that said Letters Patent is hereby corrected as shown below:

Please make the following correction:

Column 6, Line 30 "defined in claim 8" change to

--defined in claim 6--

Signed and Sealed this

Eleventh Day of December, 1990

Attest:

HARRY F. MANBECK, JR.

*Attesting Officer*   *Commissioner of Patents and Trademarks*